(12) United States Patent
Manning

(10) Patent No.: US 6,364,685 B1
(45) Date of Patent: Apr. 2, 2002

(54) CONNECTOR WITH ARTICULATED LATCH

(76) Inventor: Randy Marshall Manning, 824 Indiana Ave., Lemoyne, PA (US) 17043

( * ) Notice: Subject to any disclaimer, the term of this patent is extended or adjusted under 35 U.S.C. 154(b) by 0 days.

(21) Appl. No.: 09/706,171

(22) Filed: Nov. 3, 2000

(51) Int. Cl.[7] .......................................... H01R 13/627
(52) U.S. Cl. ...................................... 439/357; 439/354
(58) Field of Search ................................ 439/357, 358, 439/350, 352, 353, 354, 355, 676; 385/55, 56, 60, 76–78, 81–86

(56) References Cited

U.S. PATENT DOCUMENTS

| | | | |
|---|---|---|---|
| 5,254,014 A | * 10/1993 | Yagi et al. | 439/353 |
| 5,295,855 A | * 3/1994 | Walz | 439/354 |
| 5,579,425 A | * 11/1996 | Lampert et al. | 385/59 |
| 5,613,869 A | * 3/1997 | Erlich et al. | 439/344 |
| 5,651,690 A | * 7/1997 | Klas et al. | 439/352 |
| 6,017,153 A | * 1/2000 | Carlisle et al. | 385/56 |
| 6,019,521 A | * 2/2000 | Manning et al. | 385/77 |
| 6,059,597 A | * 5/2000 | Endo et al. | 439/352 |
| 6,102,581 A | * 8/2000 | Deveau et al. | 385/56 |
| 6,149,313 A | * 11/2000 | Giebel et al. | 385/59 |

* cited by examiner

Primary Examiner—Brian Sircus
Assistant Examiner—Son V. Nguyen

(57) ABSTRACT

A connector for engaging a mating connector comprising: (a) a housing having a longitudinal axis and a front and back orientation and being adapted for receiving a signal carrying medium; and (b) an articulated latch connected to the housing at one or more primary joints and having a plurality of sections, wherein at least one of the sections has an engagement structure which is adapted to engage a corresponding structure on the mating connector such that the connector and the mating connector cannot be separated without actuating the latch, and wherein at least two sections are connected at a secondary joint, the primary and secondary joints being configured such that, when an actuating force is applied to the articulated latch, a moment on one side of the actuation point is reduced by an opposing moment on the opposite side of the actuation point, thereby reducing the axial force on the connector.

14 Claims, 10 Drawing Sheets

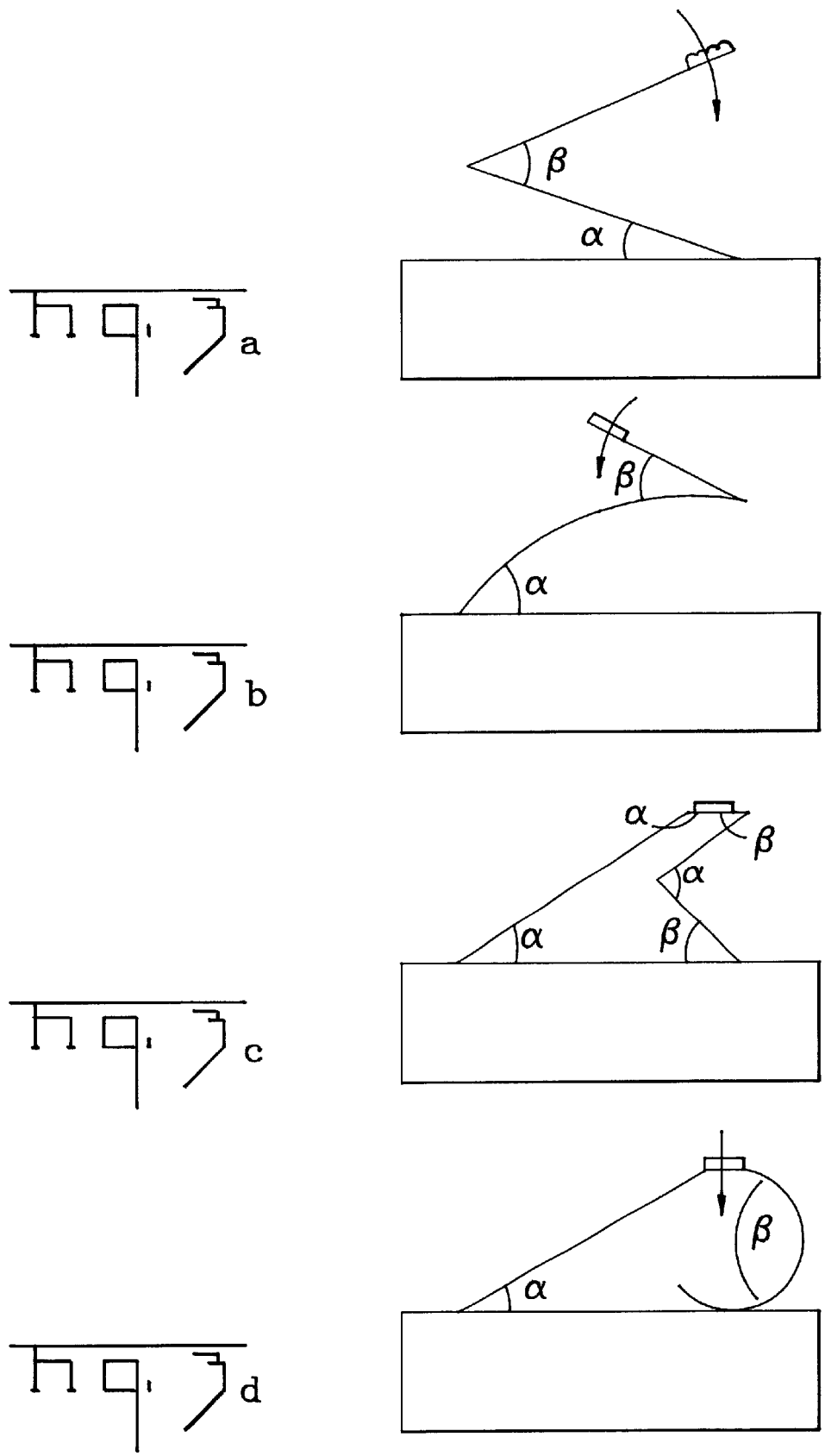

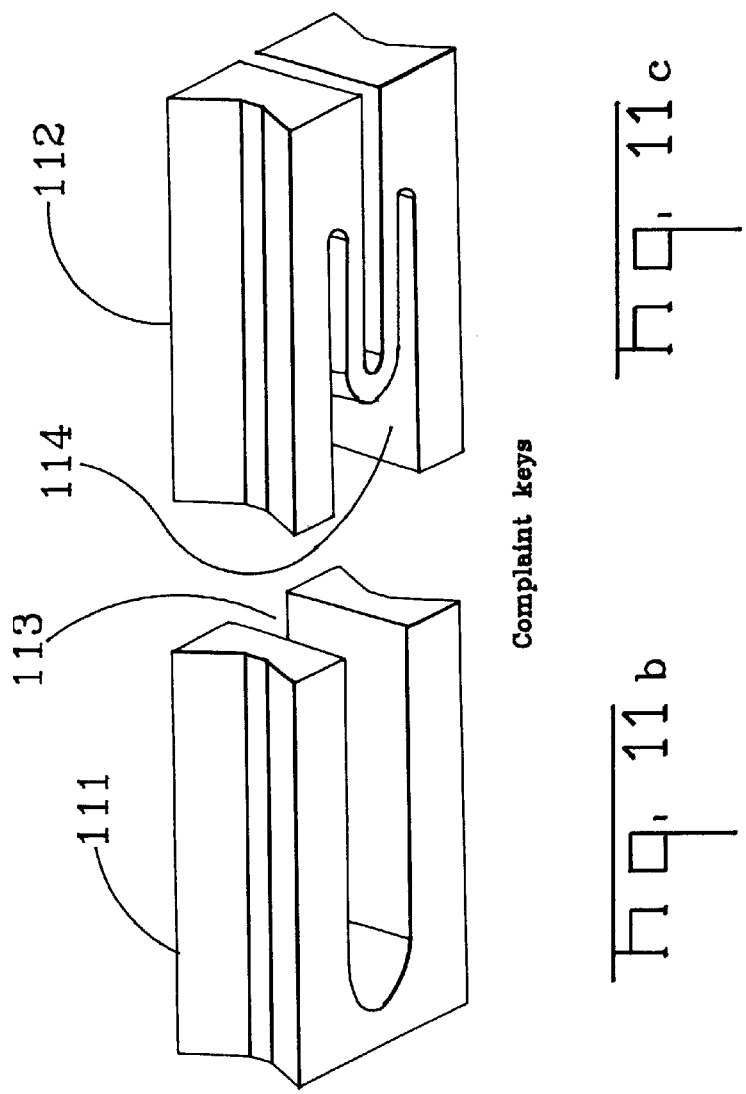
Fig. 11c
Fig. 11b
Complaint keys
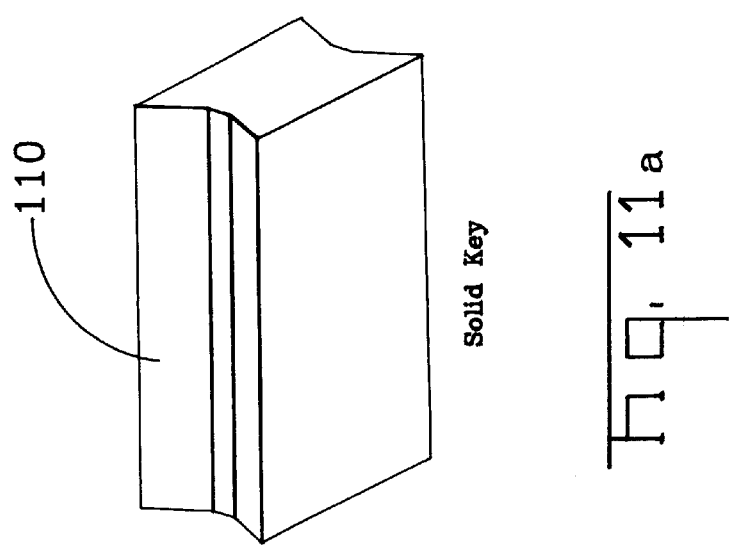
Fig. 11a
Solid Key

CONNECTOR WITH ARTICULATED LATCH

FIELD OF INVENTION

The present invention relates generally to connectors and, more specifically, to a connector for use with optical fibers or electrical conductors and having a latch to effect its disengagement with a mating connector.

BACKGROUND OF INVENTION

Optical fiber connectors are an essential part of substantially any optical fiber communication system. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to hold two optical fiber ends such that the core of one of the fibers is axially aligned with the core of the other fiber. This way, all of the light from one fiber is coupled to the other fiber. This is a particularly challenging task because the light-carrying region (core) of an optical fiber is quite small, for example, in single-mode optical fibers the core diameter is about 8 microns.

Because of the growing acceptance of optical fiber in television, data, and telephone (multimedia) communications, the need to provide higher density interconnection arrangements has emerged. Furthermore, it is always desirable to reduce cost while still providing a connector that is acceptable to customers. Recognizing the engineering challenge posed by the alignment of two very small optical fiber cores, it is still desirable to provide connectors which are smaller, less expensive, and yet more convenient for users to manipulate.

To this end, a connector was introduced which is described in detail in U.S. Pat. No. 5,481,634, which is hereby incorporated by reference in its entirety. This connector is commercially available from Lucent Technologies as the Lucent LC connector, and is referred to herein as the "LC connector." Reference is made to FIG. 9 which shows a perspective view of an optical fiber connector 110 which, together with bend-limiting strain-relief boot 102, terminates optical cable 130. This optical fiber connector has a generally rectangular shape with a square cross section. The outside surface of the connector 110 includes a spring latch 120 which is used for securing the connector to an associated receptacle in order to prevent unintended decoupling between the two.

Spring latch 120 is molded into the housing and includes a "living hinge" 125 which allows tab 126 to be moved up and down in a direction which is generally perpendicular to the central axis of connector 110. Spring latch 120 includes a pair of shoulders 121 that are positioned on opposite sides of a tab 126 and are automatically deflected downward during insertion into an associated receptacle. Spring latch 120 returns to its original position by its own restorative force. Each of the shoulders 121 includes a vertical surface 122 which interacts with a corresponding vertical surface within the receptacle to hold the connector 110 and receptacle together, that is, until the latch is once again deflected downward and the connector is partially ejected from the receptacle due to the force from an internally disposed spring used to bias the ferrule forward. It is noted that latch 120 is a cantilever beam which is made from a material that can be deformed somewhat by the application of force, but returns to its original shape after the force is removed. The connector and latch are typically molded from a commodity thermoplastic in order to achieve a low-cost, lightweight housing for optical components contained therein. A fingernail groove 123 is positioned at the back end of latch 120 along with a tab head 124 that facilitates manipulation of latch 120. Although the LC connector is effective in providing alignment of two very small optical fiber cores, it tends to have an awkward feel when being released from a mating connector. More specifically, when releasing the latch, there is a tendency to push the connector forward thereby making the backward withdraw of the connector from the receptacle more difficult. This is especially true if the LC connector is in a confined space and there is little room to manipulate the latch. Such a situation arises, for example, when the LC connector is integrated with a built-out attenuator (BOA).

The applicant has recognized that the principal cause of the connector's awkward feel and its tendency to be pushed forward when being released is the combination of the inaccessibility of the preferred location to depress the latch--namely the area around the fingernail groove 123, and the geometry of the accessible portion--namely the tab head 124, which has a backward slope. When a user attempts to depress the latch and is unable to reach the area around the fingernail groove 123 as is often the case when the connector is used in a tightly-packed backplane application or is coupled to a BOA, he is more or less forced to apply force to the more-accessible but backward-sloping tab head 124. Any downward force applied to the tab-head will necessarily have a forward force component associated with it due to the slope of the tab head. Thus, the action of the user depressing the latch by using the tab head 124 will cause the connector to be pushed forward thereby making release from the associated connector more difficult.

The awkward feel of the LC connector is magnified with the anti-snag protector embodiment as shown in FIG. 10. This embodiment is described in detail in U.S. Pat. No. 5,719,977. Briefly, the latch 120 comprises a trigger 130 which prevents the connector 110 from snagging on other cables. The patent also states that the trigger 130 makes the latch 120 easier to operate. When releasing this latch 120 with the trigger 130, however, not only must the user overcome the problems described above with respect to the latch 120, but also he must overcome a forward force vector imparted by the trigger 130 itself. More specifically, the trigger 130 pivots about a single rear point. Since the trigger is attached to the housing of the connector at a single point, the trigger necessarily travels in an arc when being actuated to effect the connector's release. This arc necessarily means that a component of the force being applied to the trigger, at some point, is not perpendicular to the axis of the housing. In other wards, during a portion of the trigger's travel during actuation, a component of the force used to actuate the latch is axial to the housing. Furthermore, given the forward rotation and particular geometry of the trigger 130, this axial force component is directed forward, particularly during the beginning of its deflection. Therefore, as the user actuates the latch, a forward axial force is applied to the connector making its withdrawal from the receptacle more difficult.

Therefore, a need exists for a connector which is similar in size and function to the LC-connector but which does not introduce a forward force component when its latch is actuated. The present invention fulfills this need among others.

SUMMARY OF INVENTION

The present invention is directed to a connector having a latching mechanism, which, when actuated, does not introduce a significant forward force to the connector. To this end, the latching mechanism comprises an articulated latch having joints configured such that the moment on one side of the actuation point is substantially reduced if not canceled by an opposing moment on the opposite side of the actuation point. This way, the net rotation on the latch is minimized. Minimizing the net rotation on the latch reduces the axial force on the connector.

In a preferred embodiment, the connector comprises: (a) a housing having a longitudinal axis and a front and back orientation and being adapted for receiving a signal carrying medium; and (b) an articulated latch connected to the housing at one or more primary joints and having a plurality of sections, wherein at least one of the sections has an engagement structure which is adapted to engage a corresponding structure on the mating connector such that the connector and the mating connector cannot be separated without actuating the latch, and wherein at least two sections are connected at a secondary joint, the primary and secondary joints being configured such that, when an actuating force is applied to the articulated latch, a moment on one side of the actuation point is reduced by an opposing moment on the opposite side of the actuation point, reducing the axial force on the connector.

BRIEF DESCRIPTION OF DRAWINGS

FIG. 3 shows schematic diagrams of various other latch configurations having opposing joints;

FIGS. 11A–C shown preferred embodiments of the key used to join connectors of the present invention together to form multi-connector arrays.

DETAILED DESCRIPTION OF INVENTION

The latch mechanism of the present invention is suitable for any connector that effects the connection of a signal-carrying medium to a mating connector. As used herein the term "signal-carrying medium" refers to any conventional material used for carrying signals and includes optical waveguides, such as glass optical fibers and plastic optical fibers, and electrical conductors, such as copper and aluminum. The term "mating connector" as used herein refers broadly to any structure configured to receive a connector and to couple the signal-carrying medium contained therein with a device or another signal-carrying medium. Mating connectors include, for example, connector couplings, adaptors, simplex/duplex ports, backplane interfaces, passive devices, such as attenuators and multiplexers/dimultiplexers, and active devices, such as transceivers and simplex transmit/receive devices.

Although the present invention may be practiced with any connector, for illustrative purposes, the description herein refers in detail to an optical connector which, except for its latching mechanism, has a configuration similar to the LC connector as described in U.S. Pat. No. 5,481,634, incorporated by reference herein. The internal components of the connector of the present invention that function to hold and present the signal-carrying medium are well known and are not the focus of the present invention. Accordingly, details of their configuration are not addressed specifically herein.

Figure 1A:
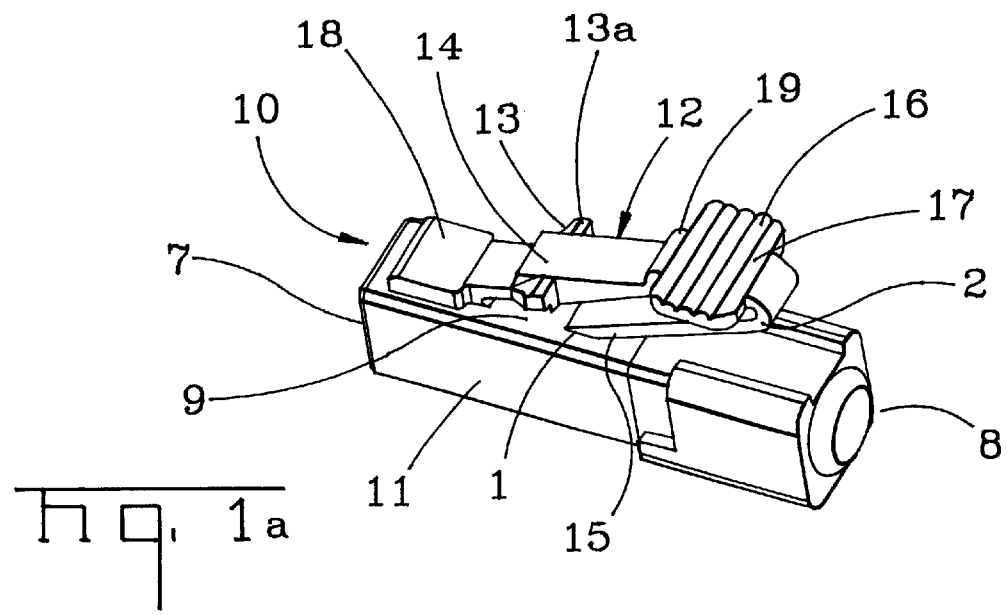
FIG. 1A shows a perspective view of a connector of the present invention in which the articulated latch is connected to the housing at two points.
Figure 1B:
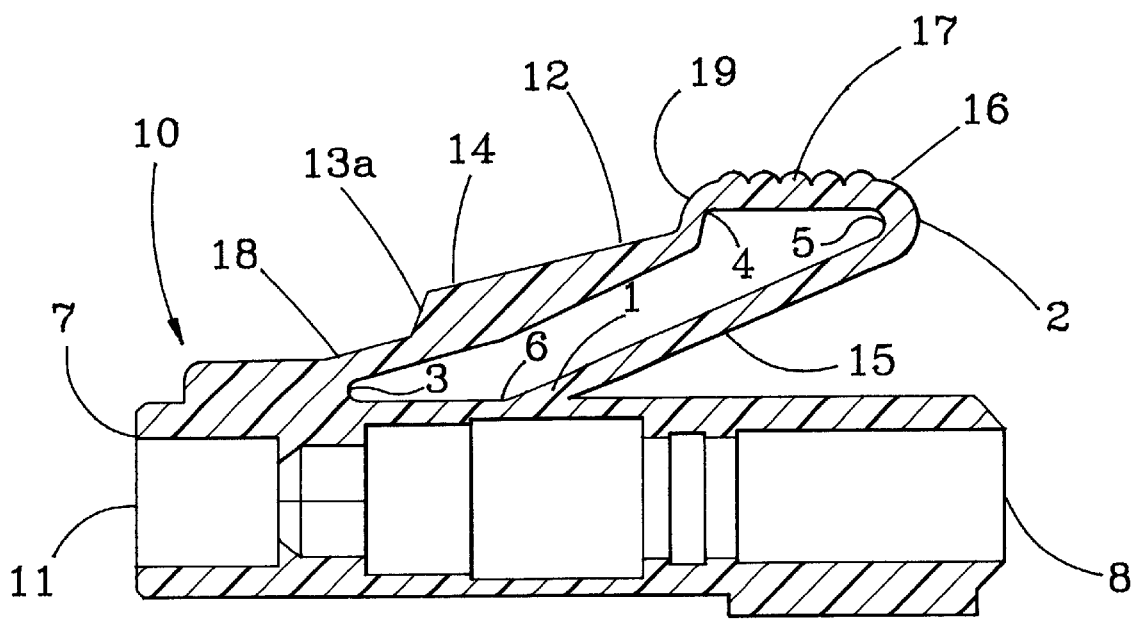
FIG. 1B shows a cross sectional view of the connector of FIG. 1A.

Referring to the figures, FIGS. 1A and 1B show a perspective view and a cross-sectional view, respectively, of a preferred embodiment of the connector of the present invention. More specifically, connector 10 comprises a housing 11 and a latch 12. The housing has a front 7 and back 8, and, as shown, a rectangular cross section, although any cross-sectional shape is possible within the scope of the invention.

The articulated latch 12 is connected to the housing and comprises a plurality of joined sections. More specifically, the joined sections comprise first and second parallel sections 14,15, each having a proximate end 18,1 and distal end 19,2, respectively. A third section 16 is joined between distal ends 19,2 to connect the first and second parallel sections 14, 15 together. Thus, as shown, the first, second and third sections form a parallelogram with a portion 9 of the housing 11. The significance of this structure is discussed below with respect to minimizing the net forward axial force on the housing during actuation.

The principal function of the articulated latch 12 is to engage a structure on a mating connector (not shown) to effect a mechanical connection with the mating connector such that the connector and the mating connector cannot be separated without actuating the latch. The particular engagement structure used can vary, although, as shown in Figs. 1A and 1B, generally one section 14 has an engagement structure 13 comprising an engagement surface 13a which interacts with a corresponding surface within the mating connector to hold the connector 10 and mating connector together until the latch is deflected downward. Again, engagement structures are well known in the art and the present invention can be practiced with any convention configuration such as that used in the LC connector or in the well-known RJ-type connectors. Since the engagement structure is well known and is not a focus of the present invention, it is not addressed in detail herein.

The third section 16 comprises a finger pad 17 to accommodate a user's finger in the actuation of the latch 14. As depicted, the finger pad offers a large area relative the size of the latch and thus provides a convenient means by which the user can actuate the latch. In this particular embodiment, the finger pad is formed as part of the third section 16 which is the portion of the parallelogram that is substantially parallel to the housing's axis. This configuration is advantageous as discussed below since the pad will remain substantially parallel to the housing as the parallelogram is compressed during the latch's actuation. Because the pad is substantially parallel to the housing through the travel of the latch, the user is less likely to introduce a forward axial force component to the connector.

Figure 2A:
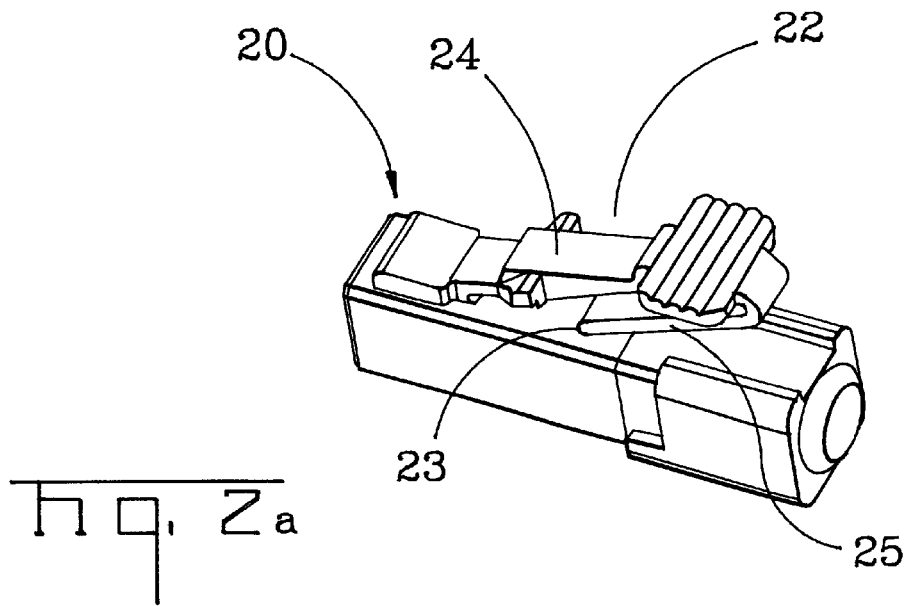
FIG. 2A is a perspective view of a connector of the present invention in which the latch is connected to the housing at one point and slides along the housing at another point.
Figure 2B:
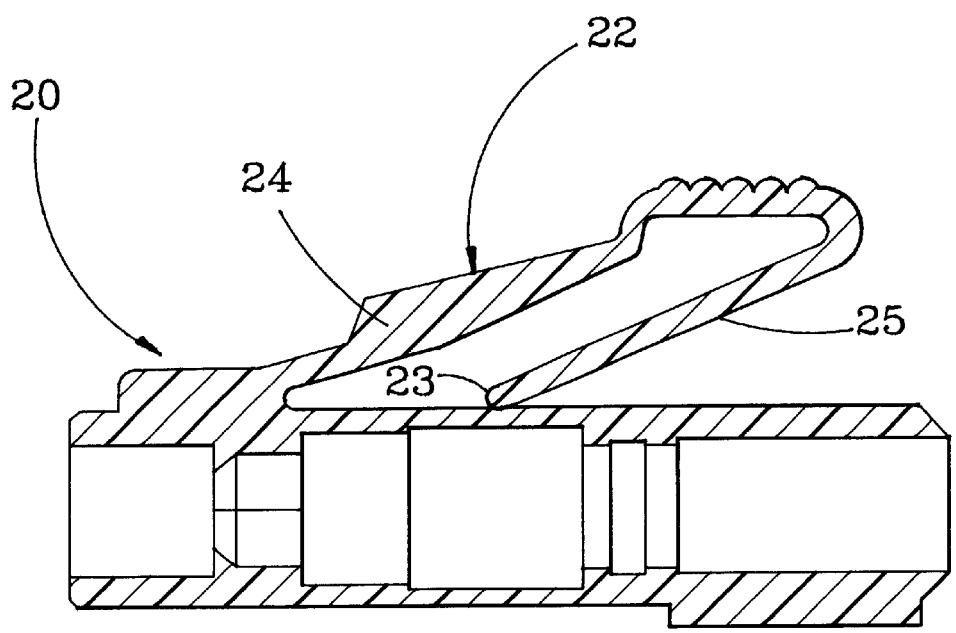
FIG. 2B shows a cross sectional view of the connector of 2A.

In the embodiment of FIGS. 1A and 1B, the articulated latch is connected to the housing at primary joints 3, 6 and the sections are connected at secondary joints 4, 5. The embodiment depicted in FIGS. 2A and 2B is substantially similar to that of FIGS. 1A and 1B expect that the latch is not connected to the housing at primary joint 6, but rather section end 23 simply slides along the housing. The dynamics of the latch mechanism configuration of FIGS. 2A &B is addressed below with respect to the free-body diagram of FIG. 6B. Unless otherwise indicated, the term "joint" as used herein refers to either the primary or secondary joints, and includes any mechanism for connecting two or more members together such that the members are hinged relative to each other. Examples of joints include, for example, thin, flexible structures integral to the latch sections, discrete hinges of flexible material attached to the latch sections, pin hinges connected to the latch sections, and a structure integral to a section which facilitates linking to another section. Preferably, the joint comprises a tapered portion of the latch which is thinner than the section(s) connected to it such that, when an actuating force is applied to the latch, the thin portion bends more readily than the section(s).

The primary and secondary joints 3, 4, 5, & 6 are configured such that, when an actuating force is applied to the articulated latch, any moment about a particular joint is reduced by opposing moments about one or more other joints. Preferably, the moment about a particular joint is substantially canceled by the moment of one or more other joints such that the net forward axial force on the housing is insignificant. It may even be preferable to configure the joints so that a net backward axial force on the housing results from the actuation of the latch.

To substantially cancel axial forces, it is preferred that each joint has an opposing joint. The term "opposing joints" as used herein refers to two joints in which one joint has sections extending from one side, while the other joint has sections extending from on the opposite side. For example, in the simple case, a first joint, which connects sections that are located on its left side, is an opposing joint to a second joint, which connects sections that are located on its right side. As will be apparent to one skilled in the art, upon actuation, a moment about one joint will generally be met with a roughly equal but opposite moment about an opposing joint providing that the resiliency of the joints is substantially the same. These equal but opposite moments will tend to cancel each other. For example, with reference to the parallelogram shown in FIGS. 1A and 1B, joints 3 and 6 are opposing and joints 4 and 5 are opposing. Examples of other opposing joints are shown in the schematic representations of various latch configurations of the present invention in Figures (a)–(d) in which the α and β joints for each configuration are opposing.

As mentioned above, the articulated latch is preferably a parallelogram. Not only does such a configuration have opposing joints which, as mentioned above, tend to result in no net forward axial force, but such a configuration also maintains the finger pad 17 at a substantially parallel position to the housing 11 during actuation of the latch thereby minimizing the axial force introduced to the housing. Specifically, referring to FIGS. 4 and 5, the actuation of parallelogram latches 12 and 14 of FIGS. 1A and 2A, respectively, is shown. Each figure shows the latch in its relaxed position (outlined figure) and in its actuated position (solid figure). It is suggested that these figures be viewed in conjunction with the free-body diagrams of the parallelogram latch during actuation as shown in FIGS. 6A and 6B. The physics discussed in the free-body diagrams and other theoretical discussions herein is intended only for illustrative purposes and is not intended, in any way, to limit the scope of the claims. Further, while the discussions herein represent the applicant's current understanding of the physics involved with the present invention, the applicant does not intend the present invention to be tied to a particular scientific theory, nor should the patentability of the claims, at this time, be determined based upon a particular scientific theory.

Figure 4:
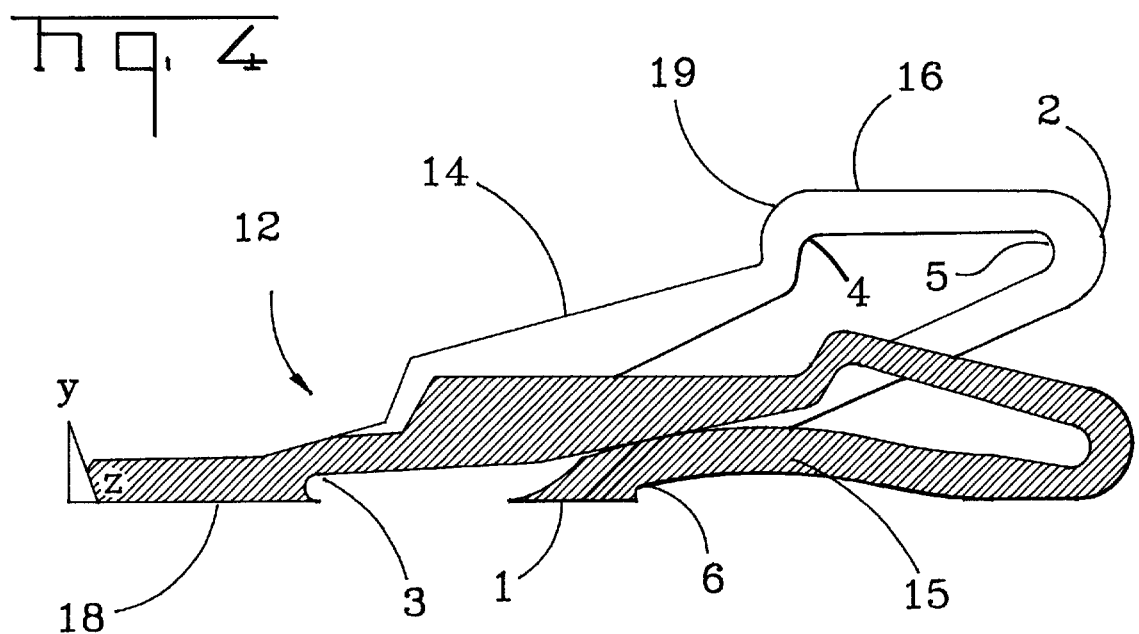
FIG. 4 depicts the articulated latch of the connector of FIG. 1A in its relaxed and actuated states.

The free-body diagram of FIG. 6A corresponds to the actuation of the latch depicted in FIG. 4. Application of a force F on the top section of the latch results in moments about the joints. Specifically, counterclockwise and clockwise moments $M_1$ and $M_2$ are induced about joints 3 and 6, respectively, and counterclockwise and clockwise moments $M_a$ and $M_b$ are induced about joints 4 and 5, respectively. These moments correspond to reaction forces on the connector. Specifically, force F causes a downward reaction force $R_{1y}$ and a forward force $R_{1x}$ at the joint 3, and an upward reaction force $R_{2y}$ and a backward reaction force $R_{2x}$ at joint 6. The opposite reaction forces $R_{1x}$ and $R_{2x}$ essentially cancel each other out, thus resulting in little if any net axial force of the connector.

Figure 5:
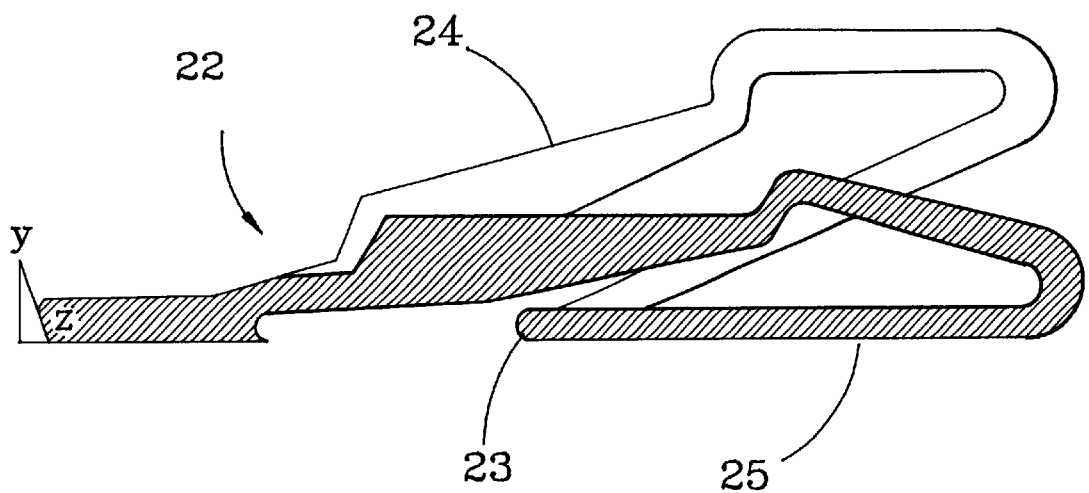
FIG. 5 depicts the articulated latch of the connector of FIG. 2A in its relaxed and actuated states.
Figure 6A:
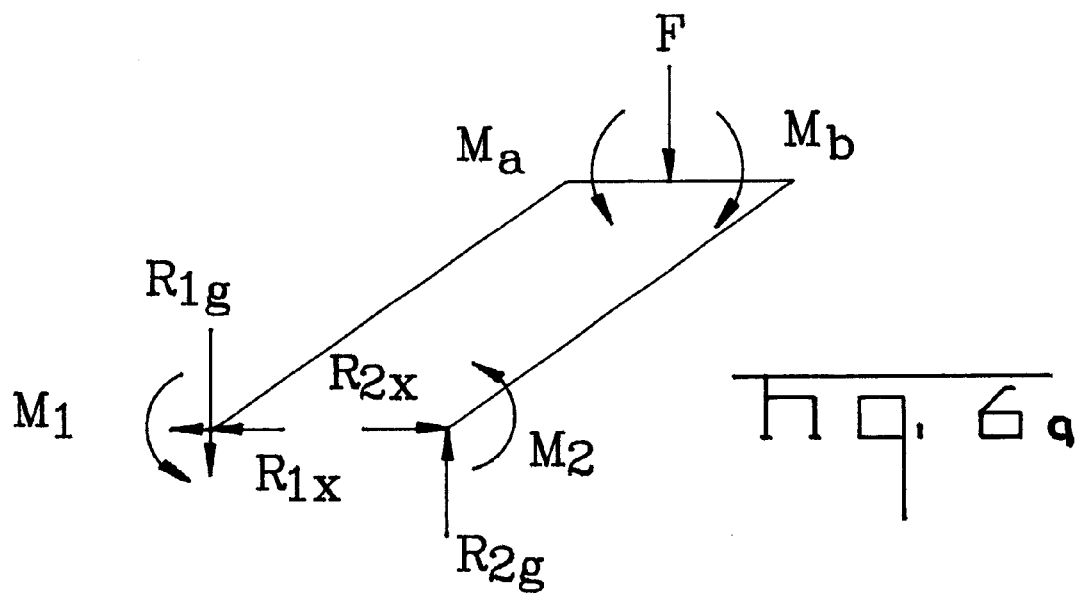
FIGS. 6A and 6B are free-body diagrams of the latch of FIGS. 4 and 5 during actuation.
Figure 6B:
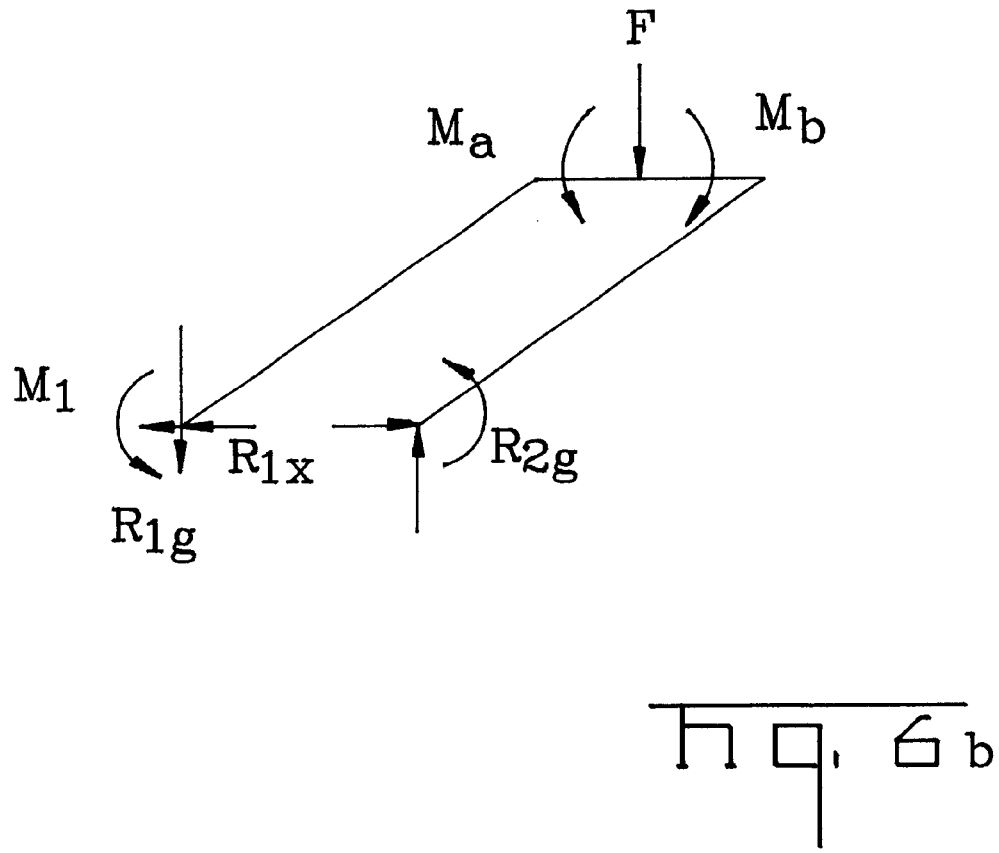

The free-body diagram of FIG. 6B corresponds to the actuation of the latch depicted in FIG. 5. Application of a force F on the top section of the latch also results in moments about the joints, although different from those of FIG. 6A. That is, a clockwise moment $M_1$ is induced about joints 3 and no moment is induced about end 23 because it slides. Like the embodiment of FIG. 6A, counterclockwise and clockwise moments $M_a$ and $M_b$ are induced about joints 4 and 5, respectively. The moment at the primary joint 3 corresponds to an upward reaction force $R_{1y}$ and a forward reaction force $R_{1x}$ at the joint 3. Although there is not a backward force on end 23 to cancel the forward force $R_{1x}$ (as there is with joint 6 in the embodiment of FIG. 6B), the opposing moments of the secondary joints tend to reduce the forward force component considerably, thereby resulting in little forward force on the connector.

Figure 7A:
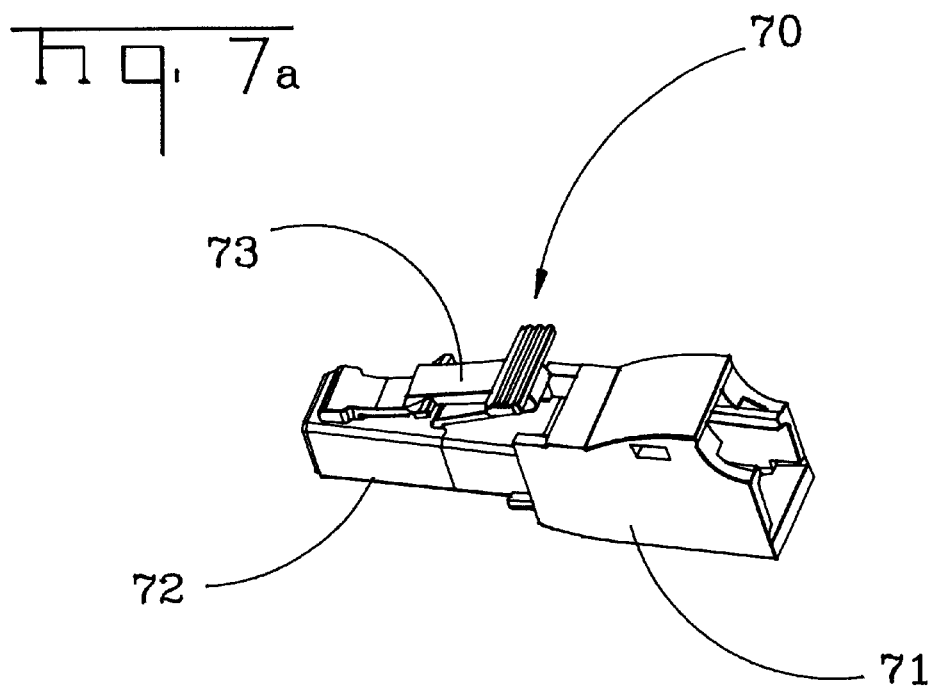
FIG. 7A is a perspective view of a built-out attenuator having a connector and latch of the present invention.
Figure 7B:
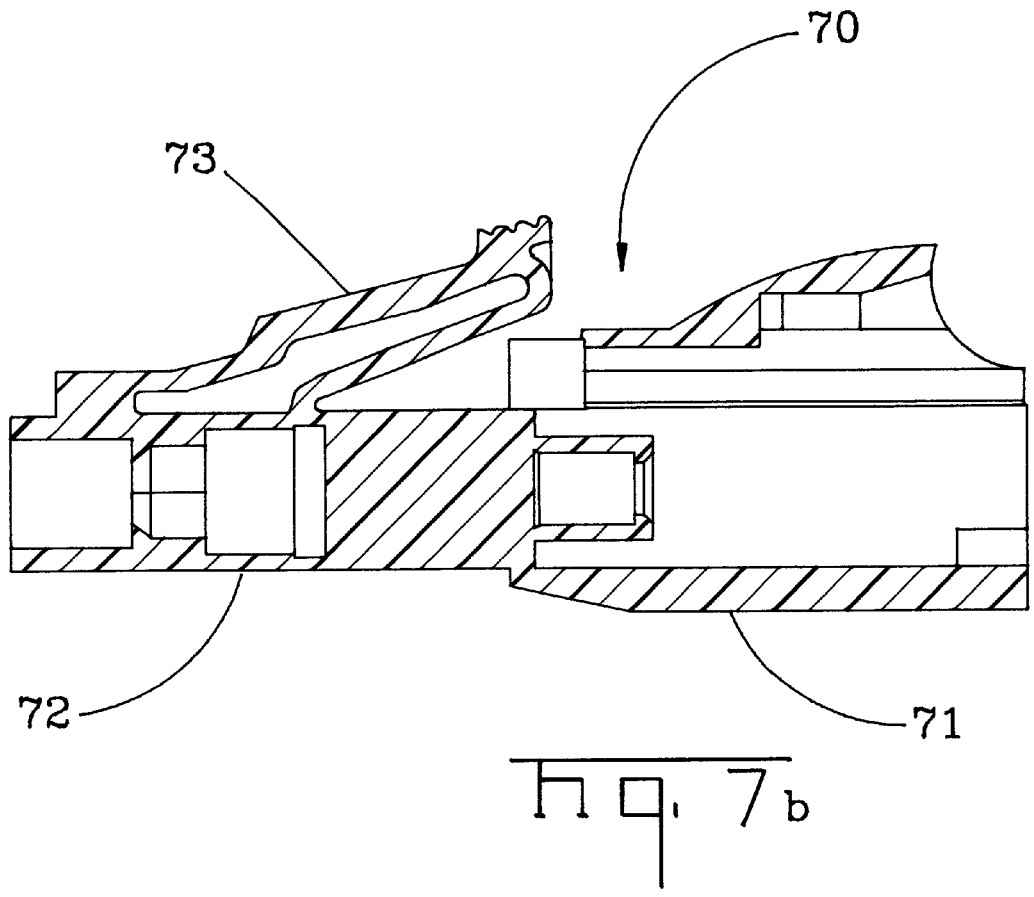
FIG. 7B is a cross sectional view of the built-out attenuator of FIG. 7A.

The intuitive feel of the latching mechanism of the claimed invention renders it useful in applications which were previously unsuitable or problematic for the LC connector. For example, the connector is particularly useful in applications in which space about the latch is restricted and renders actuation of the latch more difficult. Such an application includes, for example, a connector interfaced with a built-out attenuator (BOA) 70 as show in FIG. 7. The BOA 70 in this embodiment comprises an attenuator portion 71 and a connector portion 72 having a latch 73. Due to space restrictions, the attenuator portion 71 encroaches on the connector portion 72, resulting in a shortened latch 70 (relative to the embodiments shown in FIGS. 1A and 2A). Furthermore, there is little space in which to manipulate the latch. In the prior art, such a configuration would have presented difficulties for the user since the user would have only a small amount of space both to manipulate a shortened latch which faces forward, and to provide a backward axial force. However, with the connector of the present invention, there is no forward axial movement to overcome and the finger pad remains substantially parallel with the housing.

Figure 8A:
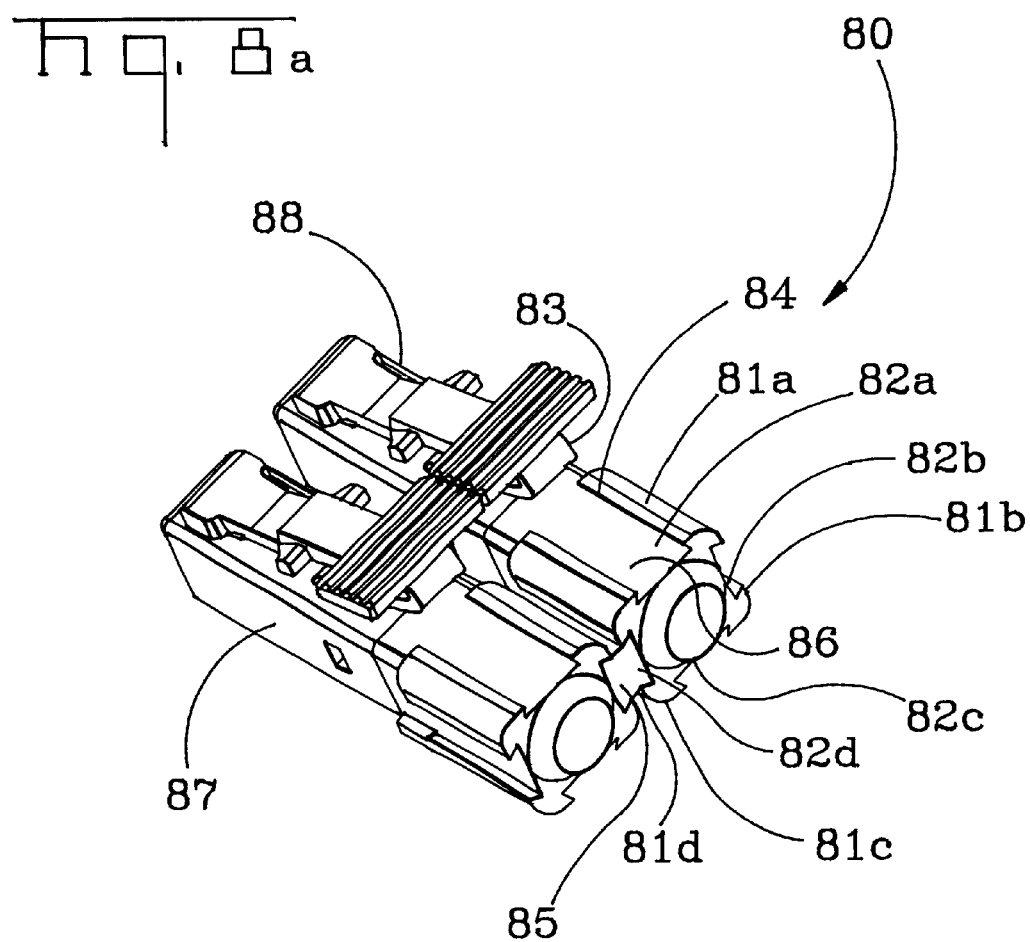
FIGS. 8A and 8B show perspective views of a side-by-side duplex and a back-to-back duplex, respectively.

Another confined space situation in which the connector of the present invention is particularly useful is with multi-connector arrays, such as duplexes. Again, the connector of the present invention is well suited for such applications given its intuitive feel and release capabilities. Furthermore, in a preferred embodiment, the connector housing 86, as shown in FIGS. 8A and B, has a square cross-section defining four identical sides 81a–d with a longitudinal groove 82a–d, respectively, running along a portion of each side. The grooves 82 are synergistic in that they serve dual functions. First, one groove 81a accommodates the actuation of the latch 83 by providing the latch with extra space to accommodate its travel. This allows the engagement mechanism of the latch to clear the corresponding engagement structure of the mating connector. Second, the grooves are preferably formed with a trapezoidal cross section or similar shape which has a restricted opening 84 at the surface. Such a shape enables a structure 85, referred to herein as a "key," to be inserted in a groove such that it cannot be pulled out of the groove perpendicular to the housing. This way, a single key 85 can be inserted into the grooves of two different connector housings to form a duplex connector. Different embodiments of the key used to effect the connection of the connectors is shown in FIGS. 11A–C. As shown, either end of a simple key 110 is configured to be received in the longitudinal slot 82d of the connector housing (see FIG. 8A). FIGS. 11B and 11C show embodiments of the key in which compliance features 113 and 114, respectively, are introduced.

Figure 8B:
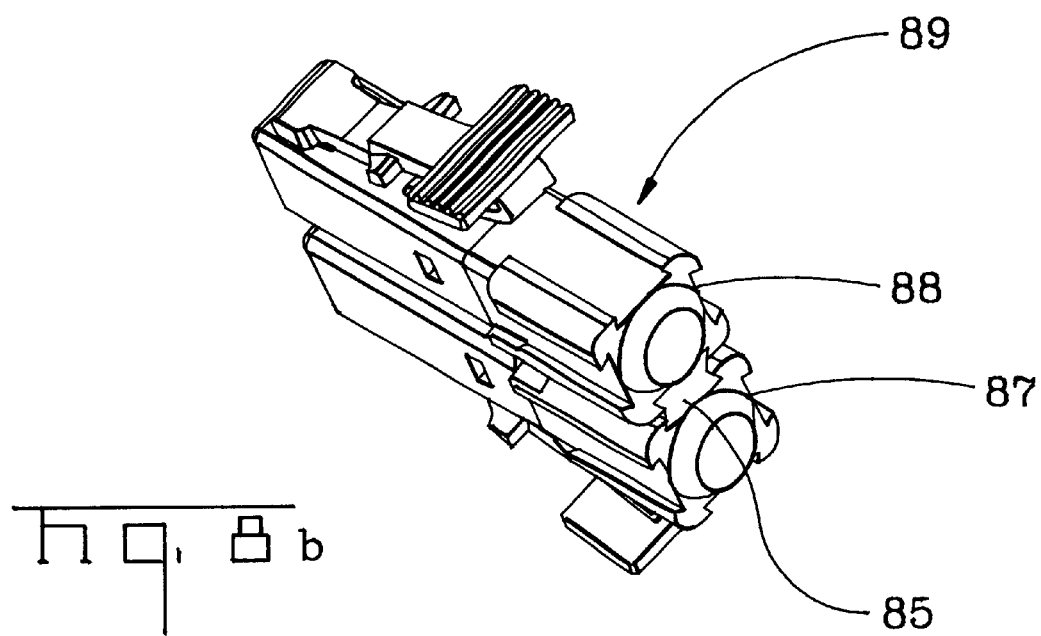
Figure 9:
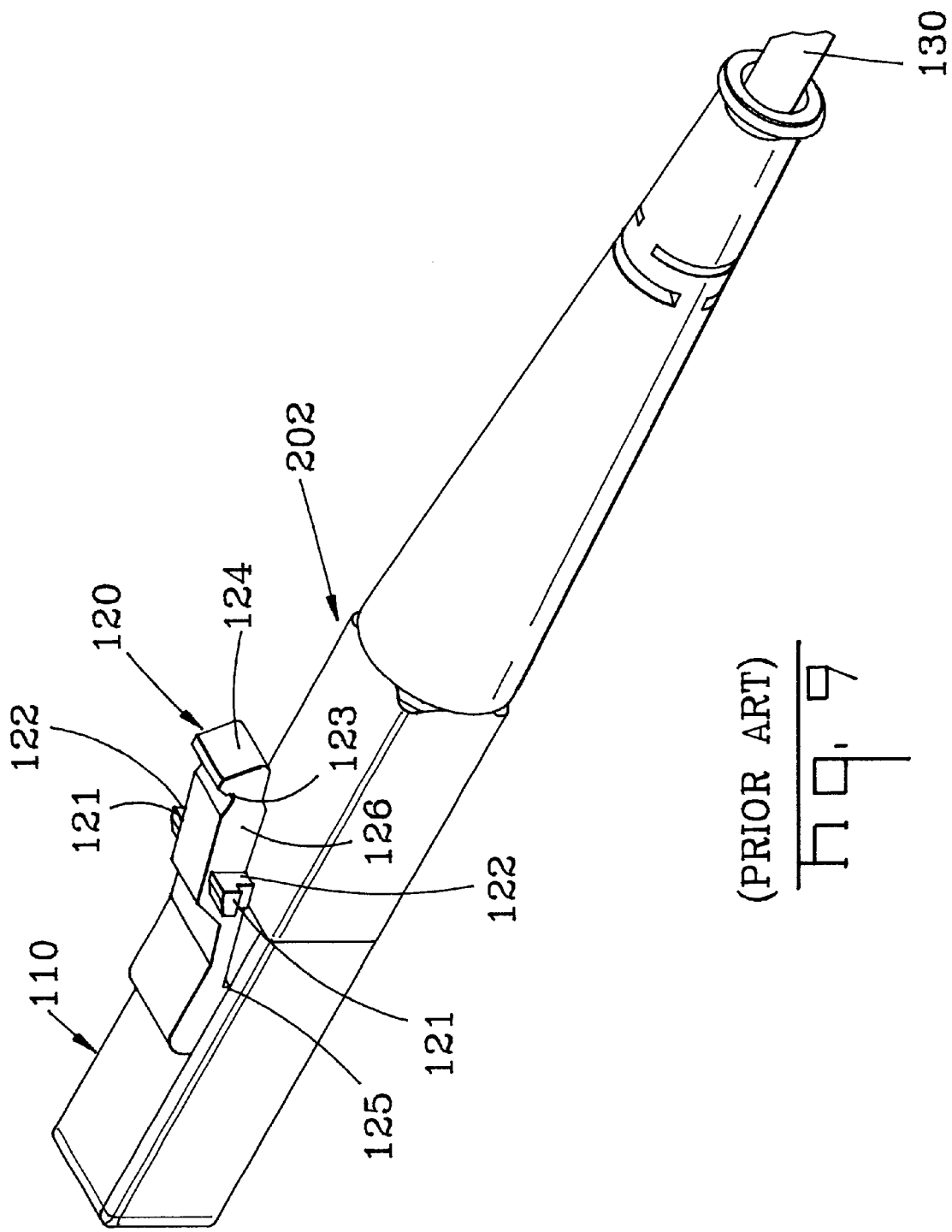
FIG. 9 shows the LC connector of the prior art.
Figure 10:
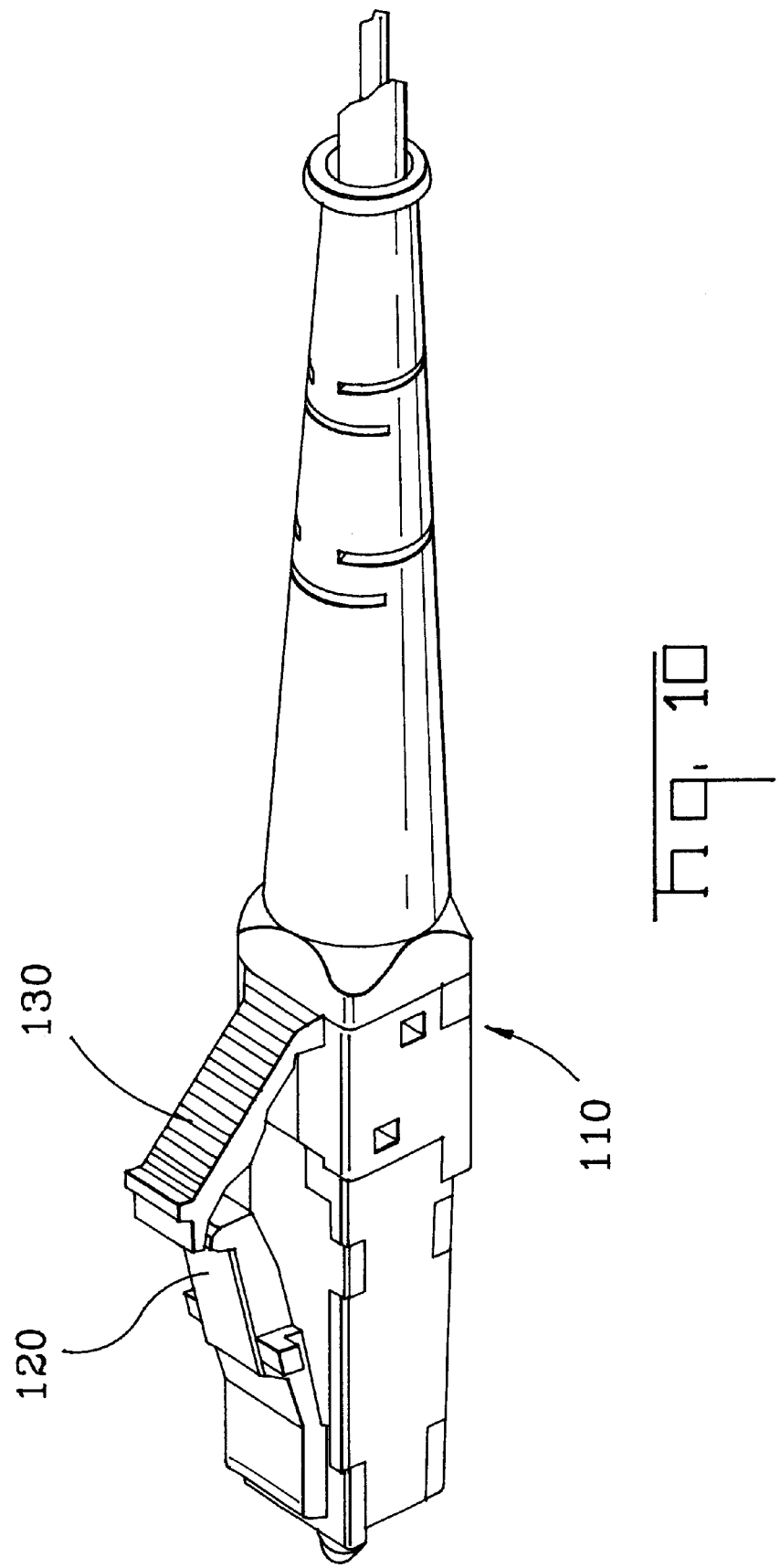
FIG. 10 shows the prior art LC connector of FIG. 9 with a trigger.

It should be apparent that a multiplicity of connectors can be "daisy-chained" together to form arrays of multiple connectors. For example, as shown in FIG. 8A, the connectors 87 and 88 can be connected to form a side-by-side duplex 80, or, as shown in FIG. 8B, the connectors 87 and 88 can be connected to form a back-to-back duplex 89. Further, it should be understood that multiple arrays of back-to-back duplexes can be connected side-by-side (and vice versa) to form multi-connector arrangements.

Aside from the same groove configuration performing two functions, the fact that the housing can be manufactured with identical grooves on all sides is advantageous from the standpoint that different housings are not required in multi-connector arrays, i.e., there are no specific left-side connector, right-side connector, or center connector housings. This reduces inventory and facilitates field assembly/modification of multiple-connector arrays. Additionally, since the sides of the housing are identical, assembly is simplified as there is no particular housing orientation with which to be concerned.

The latching mechanism of the present invention is also particularly effective in connectors having no resilient means which urge the connector backward from the mating connector. That is, in contrast to optical connectors which tend to have a spring-loaded, forward-biased ferrule that urges the connector backward when connected to the mating connector, an electrical connector or a non-spring-loaded ferrule connector does not have resilient means urging the connector backward. Thus, the backward withdrawal of such connectors from mating connectors is more difficult. However, with the latch mechanism of the present invention, there is no forward axial force imparted by the latch's actuation to overcome, thus making withdrawal of the connector easier.

What is claimed is:

1. A connector for engaging a mating connector comprising:
    a housing; and
    an articulated latch connected to said housing at one or more primary joints, said latch contacting said housing at two points, at least one of which is said primary joint, said articulated latch also having first and second parallel sections, each section having proximate and distal ends, and a third section connected to the distal ends of said first and second sections at secondary joints, said proximate end of said first section being joined to said housing and said proximate end of said second section contacting said housing, wherein said first and second parallel sections, said third section and a portion of said housing substantially form a parallelogram, and wherein said first and second sections move to maintain a substantially parallel relationship when said latch is actuated, said third section having an actuation point and either said first or second sections having an engagement structure, said engagement structure being adapted to engage a corresponding structure on said mating connector such that said connector and said mating connector cannot be separated without actuating said latch, wherein said primary joint of said one or more primary joints and one of said secondary joints are located on opposite sides of said actuation point such that, when an actuating force is applied to said actuation point, a moment of said primary joint is opposed by a moment of said secondary joint.

2. The connector of claim 1, wherein said proximate end of said second section is joined to said housing.

3. The connector of claim 1, wherein said proximate end of said second section slidably contacts said housing.

4. The connector of claim 1, wherein said housing has a rectilinear cross section to define a number of identical sides and each side defines a groove with all of said grooves being identical in shape, and each groove adapted to receive at least a portion of at least one section of said latch when said latch is fully articulated and to receive a key that connects a second housing, which is identical to said housing, to said housing.

5. The connector of claim 4, wherein said grooves have a trapezoidal cross section.

6. The connector of claim 5, wherein the connector is part of a multi-connector assembly.

7. The connector of claim 1, wherein the connector is integrated with an attenuator.

8. A connector for engaging a mating connector comprising:
    a housing; and
    an articulated latch connected to said housing and comprising at least a first, second and third section, said first and second sections being parallel and having distal and proximate ends, said proximate end of said first section being joined to said housing at a primary joint, said proximate end of said second section contacting said housing, said third section being connected between the distal ends of said first and second sections such that said first, second and third sections form substantially a parallelogram with a portion of said housing between said primary joint and said proximate end of said second section, at least one of said sections having an engagement structure which is adapted to engage a corresponding structure on said mating connector such that said connector and said mating connector cannot be separated without actuating said latch, wherein said third section and said portion of said housing remain substantially parallel when said latch is actuated.

9. The connector of claim 8, wherein said proximate end of said second section is joined to said housing.

10. The connector of claim 8, wherein said proximate end of said second section slidably contacts said housing.

11. The connector of claim 8, wherein the connector is integrated with an attenuator.

12. The connector of claim 8, wherein the connector is part of a multi-connector assembly.

13. The connector of claim 8, wherein said first and second sections move to remain substantially parallel when said latch is actuated.

14. The connector of claim 8, wherein said third section comprises a pad substantially parallel to said portion of said housing, said pad being an actuation point on said latch such that said latch is actuated by applying a force to said pad, and wherein said pad remains substantially parallel to said portion as said latch is actuated.

* * * * *